July 4, 1961  P. R. TULLY ET AL  2,990,582
COLOR STRIPING OF POLYTETRAFLUOROETHYLENE RESIN
Filed April 1, 1959  2 Sheets-Sheet 1
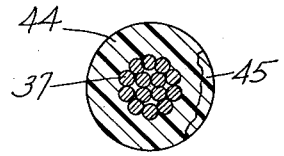
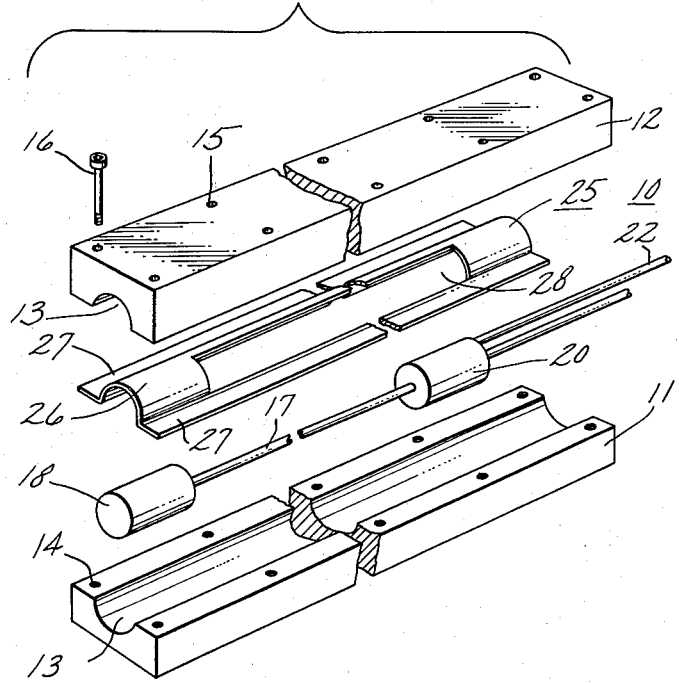
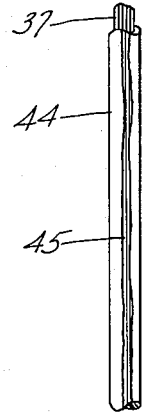
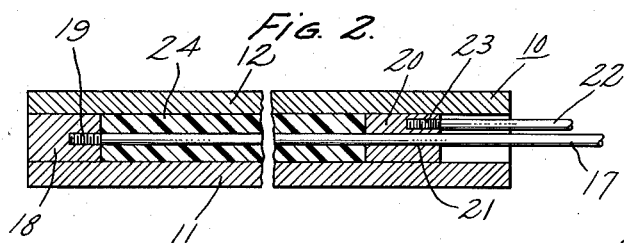
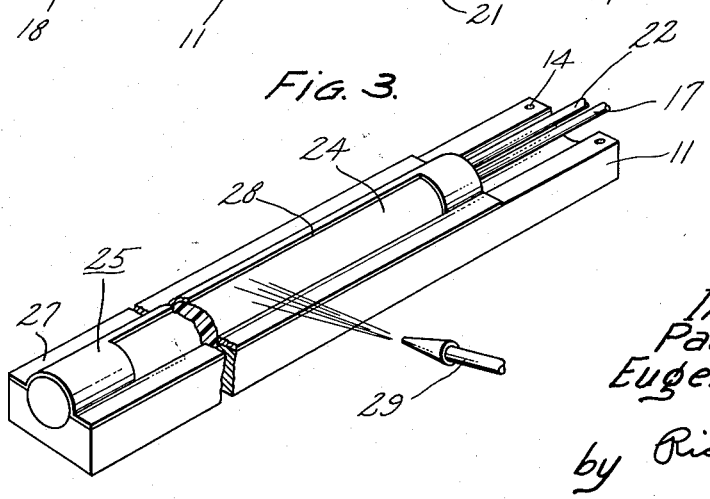
Inventors:
Paul R. Tully
Eugene D. Scalera
by Richard L. Caslin
Their Attorney

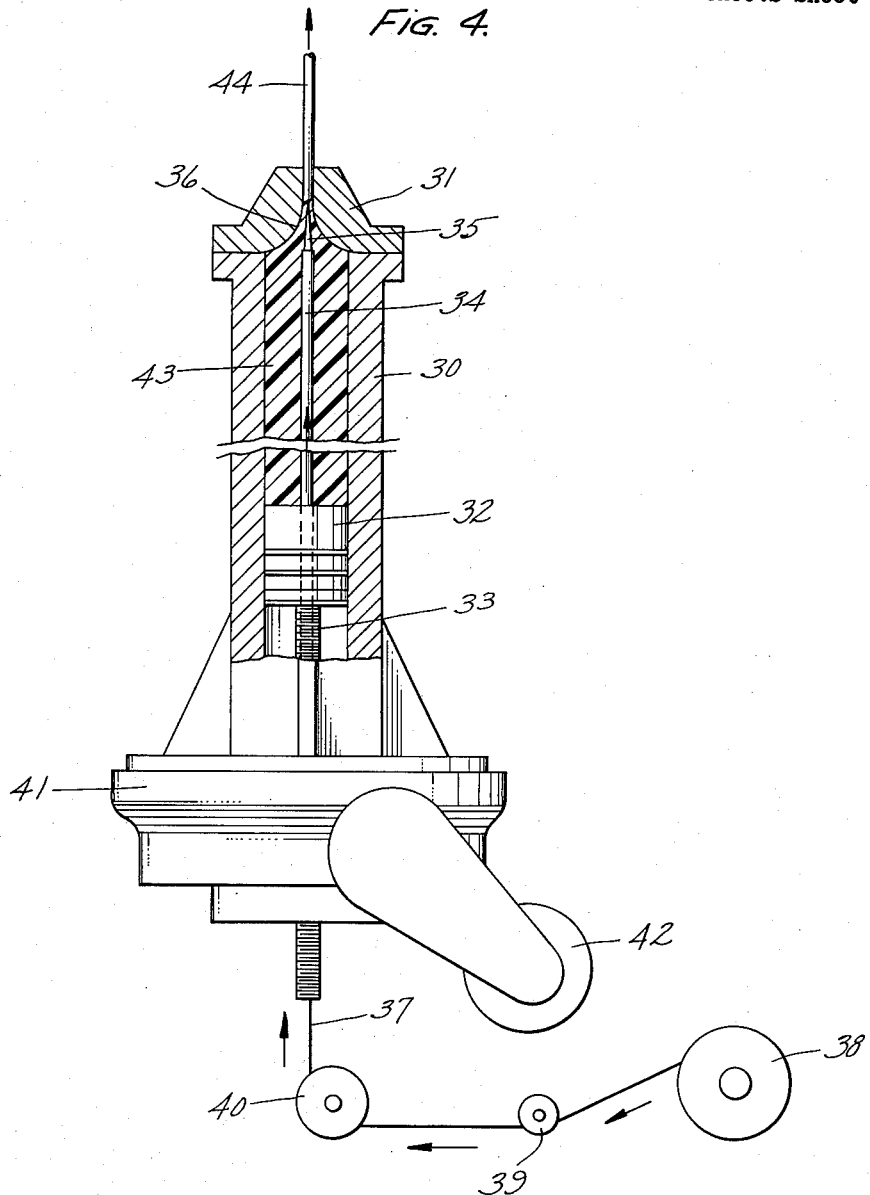

United States Patent Office 2,990,582
Patented July 4, 1961

2,990,582
COLOR STRIPING OF POLYTETRAFLUORO-ETHYLENE RESIN
Paul R. Tully, Lowell, and Eugene D. Scalera, Lawrence, Mass., assignors to General Electric Company, a corporation of New York
Filed Apr. 1, 1959, Ser. No. 803,476
3 Claims. (Cl. 18—59)

The present invention relates to a method of applying a color striped insulation of polytetrafluoroethylene resin to an electrical conductor. This type of resin is sold under the registered trademark "Teflon" by E. I. du Pont de Nemours & Co., Inc. "Teflon" wire insulation can operate continuously at temperatures higher than 400° F. and lower than −80° F. while maintaining excellent dielectric properties. The high dielectric characteristics of this resin enable the use of very thin walls of insulation, thereby simplifying miniaturized component part assemblies.

Unfortunately, polytetrafluoroethylene is difficult to work into various shapes by extrusion techniques applicable to either rubber or plastic compounds. This is true because the resin does not melt or flow and cannot be dissolved. The common method of applying this resin in thin coatings to wire at a satisfactory rate of speed is the paste extrusion technique. The resin is mixed in a finely divided state with a volatile organic lubricant and then compacted in a tube to form a cylindrical slug or preform that has a small hole running through the longitudinal axis thereof. The conductor to be coated is threaded through the center of an extrusion ram in the cylinder of an extruder. Then the preformed slug, which will hereinafter be referred to as a preform, will be lowered over the conductor and into the cylinder. A die head is fastened over the delivery end of the cylinder. The ram is set in motion and the wire is pulled through the cylinder, thereby extruding a thin film of the resin over the conductor. The wire is first heated to volatilize the lubricant and then sintered by heating to the required temperature, thus producing the finished product. A more detailed discussion of this procedure may be had by referring to the Liewellyn et al. Patent No. 2,685,707.

It is necessary to color code a substantial amount of this wire for the electronic industry. The earliest attempts were to color stripe the finished insulation using inking rolls. A pigment type "Teflon" emulsion has been developed recently that makes a fine striped wire but it is difficult to handle and it is expensive. Another method uses various colored "Teflon" powders which are sifted into a tube that includes suitable dividers to keep the colored powders from mixing. This would provide a preform with any combination of colored segments desired, depending on the number and spacing of the dividers. After the insulation is formed on the wire, the wire is twisted on a standard twisting machine so that the longitudinal stripe will spiral around the wire. The most serious disadvantage of this method is that it is difficult to load the different colored powders in the tubes without spilling some of them over the dividers.

The principal object of the present invention is to produce a colored stripe embedded in the insulation of a wire that is coated with a polytetrafluoroethylene resin where the coloring is provided by a suitable ink.

A further object of the present invention is to provide a novel method of extruding a colored stripe into the insulation of a wire coated with a polytetrafluoroethylene resin.

A still further object of the present invention is in the method of applying ink to a preform of polytetrafluoroethylene resin to produce a wire that is insulated with this resin and has a colored stripe embedded therein.

In accordance with the present invention, a method has been discovered for embedding a suitable ink deeply into the outer surface of the insulation of a conductor that is coated with a polytetrafluoroethylene resin. This ink cannot be rubbed off the surface because the ink was present in the resin before it was extruded so that the ink is an intimate part of the insulation. Basically, the method comprises the steps of lightly compacting the powdered resin into a tube for making a preform to the extent that it has good cohesive strength but not enough to seal the preform from absorbing a suspension of pigments through capillary action. Then the tube is opened to expose at least part of the preform so that a template may be applied over the preform and the ink may be sprayed into the area bounded by the template for the complete length of the preform. The next step is to further compress the preform by applying compressive forces against the opposite ends thereof. After this is done, the preform is assembled into the extrusion cylinder and the resin is extruded in the same manner as if the colored stripe were not part of the preform.

Our invention will be better understood from the following description taken in connection with the accompanying drawings and its scope will be pointed out in the appended claims.

FIGURE 1 is an exploded view of a split tube in which the powdered resin is first lightly compacted to make a temporary preform, the view also showing the plugs and spindle and ramrod for compacting the powders as well as the template used over the preform after the tube has been opened.

FIGURE 2 is a vertical cross-sectional view taken longitudinally of the split tube of FIGURE 1 showing the powdered resin after it has ben compacted in the tube by hand.

FIGURE 3 is an isometric view showing the split tube with the top half removed and the template placed over the temporary preform with an air gun spraying the ink into the pores of the powder.

FIGURE 4 is a diagrammatic showing of a "Teflon" wire insulating extruder partly in cross-section.

FIGURE 5 is a transverse cross-sectional view greatly enlarged of a wire that has a colored stripe of ink embedded in the outer surface of the insulation.

FIGURE 6 is a view of a short length of the wire showing the colored stripe as it appears just after the wire leaves the extrusion head.

FIGURE 7 is a view similar to that of FIGURE 6 after the wire has been twisted so that the longitudinal stripe spirals around the wire.

Referring in detail to the drawing and in particular to FIGURE 1, there is shown a split tube 10 comprising a lower half 11 and an upper half 12 that is adapted to be bolted or otherwise fastened to the lower half to form the tube. Each tube half has a semi-circular groove 13 that extends longitudinally thereof. When the halves are joined together the tube has a circular bore that is approximately two and one-half inches in diameter and about three feet long. The elongated shape of the tube explains the reason for breaking out the center portion of the tube in the illustrations of FIGURES 1-3. Looking at the lower tube half 11, there are a plurality of tapped openings 14 in the walls of the tube halves adjacent the semicircular groove 13. Aligned openings 15 are present in the upper tube half 12 for loosely receiving fasteners such as bolts 16 that extend through the upper tube half and are threaded into the lower tube half. Before this fastening operation is performed, it is necessary to install in the groove 13 of the lower tube half 11 a slender spindle 17 with a plug 18 on one end. As seen in the cross-sectional view of FIGURE 2, this spindle 17 is threaded into the plug 18 as is identified by the numeral 19. Then the upper tube half 12 is fastened to the lower half 11, thereby holding the plug 18 in place and closing one end of the tube.

Next the tube is raised to a vertical position with its open end facing upwardly and the spindle 17 extending up out of the tube. After the "Teflon" powders have been mixed in a finely divided state with a volatile organic lubricant, the powders are poured into the bore of the split tube 10. Once the powders fill the tube, a sliding plug 20 having a central aperture 21 is slipped over the spindle and brought down to rest on the powder. A ramrod 22 is threaded into the sliding plug 20, as at 23, to serve as a handle and force the sliding plug further down into the tube so that the powders will be lightly compacted by hand to the extent that the resulting temporary preform 24 has good cohesive strength but not enough to seal the preform from absorbing a suspension of pigments through capillary action.

Next the temporary preform 24 is uncovered by removing the bolts 16 and setting the upper tube half 12 to the side. A sheet metal template 25 is necessary to define or outline an area on the surface of the temporary preform 24 of about one quadrant extending the full length of the preform. This template 25 has an arched portion 26 that conforms very nearly to the shape of the top half of the preform. Leading from each side of the arched portion is a flat edging 27 which rests on the flattened upper surfaces of the lower tube half 11 as best seen in FIGURE 3. One side of the template is cut away to form a window 28 in the arched portion 26. In the drawing the window 28 outlines an area on the temporary preform 24 that covers the entire length of the preform and one quarter of the circumference. Of course, the area outlined by the template window need not be any special width as it is merely a matter of choice or preference. Colored pigments suspended in naphtha are then sprayed through the window of the template onto the preform with the aid of a small air-powered spray gun 29. A circular motion of the hand holding the gun is used to give a swirling action to the ink spray so that the ink will be washed into the pores of the preform as well as being absorbed by the powder through capillary action. A typical formulation used is as follows (parts by weight):

Liquid nitrogen process
  colored pigment _____ 4
  Kel-F #3 fluorocarbon oil _____ 9
  Naphtha _____ 86.5
  Triton X-100 _____ 0.5

If colored stripes are also desired on the opposite unexposed half of the preform, the top tube half 12 is replaced and the tube turned over so that the bottom half 11 can be removed, thereby exposing the other side of the preform for use of the template and spray gun.

The temporary preform 24 is then removed from the tube while the preform is still supported on the spindle 17 between the fixed plug 18 and the sliding plug 20. With the temporary preform 24 in this condition, the entire assembly is inserted into a second tube (not shown) so that heavier compressive forces may be exerted against the preform to reduce its length to approximately 18 inches, which is about the standard length of a preform that can be assembled in an extrusion cylinder. An alternate procedure would be to merely perform the second compressive operation in the split tube 10 rather than remove the temporary preform 24 and place it in a second tube.

Attention is now directed to the diagrammatic showing of FIGURE 4 of a typical wire insulating extruder for polytetrafluoroethylene resin. First, there is a vertical cylinder 30 with a removable die head assembly 31. Located within the cylinder is a piston 32 that is attached to the upper end of an elevator screw or ram 33. Extending upwardly from the piston 32 is a small diameter guide tube 34 that terminates in a tapered end or nozzle 35 that is located within the restricted throat 36 of the die head 21. A small hole extends upwardly through both the ram 33 and piston 32 so that a bare conductor 37 may extend upwardly into the center of the cylinder and through the guide tube 34 and out of the die head 31. The wire is payed off a small reel 38 and is strung over guide pulleys 39 and 40. The lower end of the cylinder 30 is enlarged as at 41 and houses the transmission that is powered by a drive motor 42 and operates the ram 33 to either raise or lower the piston 32.

To set up the extruder of FIGURE 4, the die head 31 is first raised and swung to one side in order to gain access to the inside of the cylinder 30. Then the bare wire 37 is fed up through the ram 33, piston 32 and guide tube 34. A "Teflon" preform 43 is next lowered carefully into the cylinder until it rests on the piston 32. Then the die head 31 is swung back over the cylinder and then lowered to the position shown in FIGURE 4, where it is clamped in place. From the die head 31 the wire travels through a vaporizing oven and then through a sintering oven. Finally, the wire will be threaded over cooling pulleys and a capstan before it is wound on a take-up reel.

First the wire is started through the extruder and the ram is raised carefully until pressure is built up within the cylinder at which time the pasty like compound will be extruded over the wire to form the finished article 44, as best seen in FIGURES 5 and 6. Looking first at FIGURE 5, the colored stripe is identified by the numeral 45 and it has the same relative width as the width of the window 28 is in proportion to the circumference of the preform. Attention is directed to the depth of penetration of the ink into the layer of insulation. This results in the permanent marking of the insulation of this type of wire which has gained wide acceptance and commendation throughout the industry. The bare wire 37, as it moves through the cylinder 30, has a tendency to twist slightly in an erratic manner. This is perhaps due to the extreme pressures that are built up around the wire in the restricted throat 36 of the die head. Thus, the colored stripe 45 is not perfectly straight as the wire 44 leaves the extruder. This characteristic is as illustrated in FIGURE 6. This, however, is not a serious handicap since the stripe 45 has the uncanny ability of straightening itself out when the wire is later twisted in a standard twisting machine to produce a spiral stripe of a predetermined pitch on the wire as illustrated in FIGURE 7.

Having described above our novel method of forming a spiral stripe of colored pigments on a wire insulated with a polytetrafluoroethylene resin, it will be readily apparent to those skilled in this art that we have first produced a quality product with a superior stripe. Secondly, this quality product has been produced by a remarkably simple method that is easy to perform with only a small amount of extra time and labor and with a negligible amount of additional cost of materials since the ink is used sparingly and is not much more expensive than ordinary water.

Modifications of this invention will occur to those skilled in this art and it is to be understood, therefore, that this invention is not limited to the particular embodiments disclosed but that it is intended to cover all modifications within the true spirit and scope of this invention as claimed.

What we claim as new and desire to secure by Letters Patent of the United States is:

1. The method of color striping the insulation of wire that is coated with a polytetrafluoroethylene resin comprising the steps of lightly compacting the resin into a split tube to make a preform, removing one side of the tube, and applying a longitudinal stripe of colored ink onto the resin preform working as much of the ink into the pores of the preform as is possible, further compacting the preform, and then extruding the preform over a wire in the usual manner.

2. The method of applying a color striped insulation of polytetrafluoroethylene resin to a wire comprising the steps of lightly compacting the resin into a preform, applying a longitudinal stripe of colored ink to the outer surface of the preform, and then extruding the preform onto a wire in the usual manner.

3. The method of applying a color striped insulation of polytetrafluoroethylene resin to a wire comprising the steps of forming a lightly compacted resin preform of cylindrical shape, of applying a template over one side of the preform to define an exposed longitudinal area for the entire length of the preform, and spraying a colored ink onto the exposed area, the ink being absorbed into the preform by capillary action, of further compacting the striped preform with endwise compression forces, and then extruding the preform onto a wire in the usual manner.

References Cited in the file of this patent

UNITED STATES PATENTS

| | | |
|---|---|---|
| 2,186,788 | Olson | Jan. 9, 1940 |
| 2,485,691 | Bogese | Oct. 25, 1949 |
| 2,631,186 | Bondon | Mar. 10, 1953 |
| 2,669,754 | Chadbourne | Feb. 23, 1954 |
| 2,885,739 | Staller | May 12, 1959 |